(12) United States Patent
Liu et al.

(10) Patent No.: US 8,971,709 B2
(45) Date of Patent: Mar. 3, 2015

(54) OPTICAL TRANSCEIVER APPARATUS AND WAVELENGTH DIVISION MULTIPLEXING PASSIVE OPTICAL NETWORK SYSTEM

(75) Inventors: Dekun Liu, Shenzhen (CN); Yusheng Bai, Santa Clara, CA (US); Huafeng Lin, Shenzhen (CN); Zhiguang Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 13/487,662

(22) Filed: Jun. 4, 2012

(65) Prior Publication Data
US 2012/0269516 A1  Oct. 25, 2012

Related U.S. Application Data

(63) Continuation-in-part of application No. PCT/CN2011/073196, filed on Apr. 22, 2011.

(51) Int. Cl.
*H04J 14/00* (2006.01)
*H04J 14/02* (2006.01)
(Continued)

(52) U.S. Cl.
CPC .......... *H04B 10/506* (2013.01); *H04B 10/2503* (2013.01); *H04J 14/0282* (2013.01)
USPC ..................... 398/67; 398/72; 398/87; 398/84

(58) Field of Classification Search
CPC .............. H04B 10/2503; H04B 10/506; H04J 14/0282
See application file for complete search history.

(56) References Cited

U.S. PATENT DOCUMENTS 5,991,058 A * 11/1999 Feuer et al. ..................... 398/72
6,882,778 B2 * 4/2005 Fondeur et al. ................. 385/37
(Continued)

FOREIGN PATENT DOCUMENTS

| CN | 1497894 A | 5/2004 |
|---|---|---|
| CN | 101426154 A | 5/2009 |

(Continued)

OTHER PUBLICATIONS

Nguyen et al; 24 channels colorless WDM-PON with L-band 10Gb/s downstream and C-band 2.5Gb/s upstream using multiple wavelengths seeding sources based on mode-locked lasers; 2010; optical society of America.*

(Continued)

*Primary Examiner* — Ken Vanderpuye
*Assistant Examiner* — Amritbir Sandhu
(74) *Attorney, Agent, or Firm* — Slater & Matsil, L.L.P.

(57) ABSTRACT

An optical transceiver apparatus includes a gain medium, a photoelectric converter, at least one AWG, and a partial reflection mirror. The at least one AWG includes two common ports and multiple branch ports. One of the two common ports functions as a signal sending port, and the other functions as a signal receiving port, where bandwidth of the signal sending port is less than that of the signal receiving port. The gain medium and the photoelectric converter are connected to one of the branch ports of the AWG. The AWG and the partial reflection mirror are configured to cooperatively perform wavelength self-injection locking on an optical signal provided by the gain medium, and output the optical signal through the signal sending port. The AWG is further configured to demultiplex an optical signal received by the signal receiving port to a branch port. A WDM-PON system is also provided.

16 Claims, 8 Drawing Sheets

(51) Int. Cl.
*H04B 10/50* (2013.01)
*H04B 10/25* (2013.01)

(56) References Cited

U.S. PATENT DOCUMENTS

| | | | |
|---|---|---|---|
| 6,882,779 B2* | 4/2005 | Kaneko | 385/37 |
| 7,167,649 B2* | 1/2007 | Song et al. | 398/72 |
| 7,295,738 B2* | 11/2007 | Waters | 385/124 |
| 7,349,631 B2* | 3/2008 | Lee et al. | 398/82 |
| 7,415,205 B2* | 8/2008 | Shin et al. | 398/5 |
| 7,903,975 B2* | 3/2011 | Sasaki et al. | 398/83 |
| 8,073,331 B1* | 12/2011 | Mazed | 398/68 |
| 8,238,756 B2* | 8/2012 | Genay et al. | 398/175 |
| 8,260,140 B2* | 9/2012 | Luo et al. | 398/87 |
| 8,463,088 B1* | 6/2013 | Asghari et al. | 385/14 |
| 8,559,821 B2* | 10/2013 | Wen et al. | 398/79 |
| 8,606,107 B2* | 12/2013 | Bai et al. | 398/70 |
| 8,849,119 B2* | 9/2014 | Jeong et al. | 398/72 |
| 2004/0067059 A1* | 4/2004 | Song et al. | 398/82 |
| 2004/0179843 A1 | 9/2004 | Jung et al. | |
| 2004/0218927 A1* | 11/2004 | Kim et al. | 398/87 |
| 2005/0135449 A1 | 6/2005 | Sorin et al. | |
| 2006/0083515 A1* | 4/2006 | Hann et al. | 398/87 |
| 2006/0256831 A1* | 11/2006 | Volodin et al. | 372/102 |
| 2007/0047608 A1* | 3/2007 | Volodin et al. | 372/50.12 |
| 2007/0133990 A1* | 6/2007 | Kim et al. | 398/72 |
| 2008/0019694 A1* | 1/2008 | Song et al. | 398/72 |
| 2008/0187314 A1 | 8/2008 | Chung et al. | |
| 2008/0232807 A1* | 9/2008 | Lee et al. | 398/87 |
| 2008/0279557 A1* | 11/2008 | Park et al. | 398/79 |
| 2009/0020839 A1* | 1/2009 | Furuyama | 257/432 |
| 2009/0220230 A1* | 9/2009 | Kim et al. | 398/72 |
| 2010/0316378 A1* | 12/2010 | Yeh et al. | 398/58 |
| 2011/0038635 A1* | 2/2011 | Bai | 398/82 |
| 2011/0064410 A1* | 3/2011 | Beckett et al. | 398/63 |
| 2012/0128359 A1* | 5/2012 | Mazzone et al. | 398/67 |
| 2012/0134669 A1* | 5/2012 | Xu et al. | 398/38 |
| 2012/0141128 A1* | 6/2012 | Bai et al. | 398/65 |
| 2012/0269516 A1* | 10/2012 | Liu et al. | 398/72 |
| 2012/0321316 A1* | 12/2012 | Presi et al. | 398/67 |
| 2013/0183039 A1* | 7/2013 | Hood et al. | 398/72 |
| 2013/0209105 A1* | 8/2013 | Jeong et al. | 398/72 |
| 2014/0016938 A1* | 1/2014 | Sandstrom et al. | 398/72 |
| 2014/0064733 A1* | 3/2014 | LIU et al. | 398/79 |

FOREIGN PATENT DOCUMENTS

| | | |
|---|---|---|
| CN | 101557540 A | 10/2009 |
| JP | 2001230733 | 8/2001 |
| JP | 2002341158 | 11/2002 |
| KR | 20040029569 A | 4/2004 |
| KR | 100860548 B1 | 9/2008 |

OTHER PUBLICATIONS

English-language International Search Report, issued by The State Intellectual Property Office, the P.R. China in International Application No. PCT/CN2011/073196, mailed Jan. 9, 2012, (3 pages).

Elaine Wong et al., "Directly-Modulated Self-Seeding Reflective SOAs as Colorless Transmitters for WDM Passive Optical Networks", Optical Society of America, PDP49, 3 pages (2006).

Swook Hann et al., "Direct-Modulated Signal Transmission Using a Self-Injection Locked F-P LD for WDM-PON", Dept. of Informaiton and Communications, Gwangju Institute of Science and Technology (GIST), South Korea, 2 pages (2005).

Won, Yong-Yuk, et al., "Full Colorless Gigabit WDM-Passive Optical Network With Simultaneous Two Different Signal Transmission,"Yonsei University, Seoul, Korea, 4 pages, Oct. 2009.

European Search Report received in European Patent Office Application No. 11752869.5-2415, mailed Oct. 23, 2012, 7 pages.

\* cited by examiner

OPTICAL TRANSCEIVER APPARATUS AND WAVELENGTH DIVISION MULTIPLEXING PASSIVE OPTICAL NETWORK SYSTEM

CROSS-REFERENCE TO RELATED APPLICATION

This application is a continuation-in-part of International Application No. PCT/CN2011/073196, filed on Apr. 22, 2011, which is hereby incorporated by reference in its entirety.

FIELD OF THE DISCLOSURE

The present disclosure relates to the field of communications technologies, and in particular, to an optical transceiver apparatus and a wavelength division multiplexing passive optical network (Wavelength Division Multiplexing Passive Optical Network, WDM-PON) system based on the optical transceiver apparatus.

BACKGROUND OF THE DISCLOSURE

As high-bandwidth fiber-optical communications technologies become more and more mature, and the application cost declines year by year, fiber access networks gradually become more competitive for next-generation broadband access networks. Among fiber access networks, passive optical networks (PONs) are especially competitive. Generally, a specific structure of a passive optical network system may be referred to FIG. 1, the passive optical network system includes an OLT (Optical Line Terminal, optical line terminal) located at a central office, an ODN (Optical Distribution Network) for branching/coupling or multiplexing/demultiplexing, and multiple ONUs (Optical Network Units) located at user ends. The PONs may be categorized into different types according to different implementations, where WDM-PON systems using the WDM technology gain much attention owing to advantages such as large bandwidth capacity, and information security of quasi-point-to-point communication. However, the WDM-PON has high cost compared with fiber access networks which use TDM (Time Division Multiplexing) technologies such as an EPON and a GPON, where the excessive cost of a light source is an important factor causing the excessive cost of the entire WDM-PON system.

The WDM-PON uses an AWG (Arrayed Waveguide Grating) or a WGR (Waveguide Grating Router) at the user end, wavelengths on AWG ports or WGR ports connected to user end ONUs are different, and therefore, different ONUs need to use optical transceiver module with different wavelengths, which are named as colored optical modules in the field of optical communications. The use of the colored optical modules in the ONUs may render the ONUs failed to be commonly used; and at the same time, bring difficulties to service distributions of an operator as well as a storage problems. In order to solve the problem of the colored ONUs, a proposal of WDM-PON colorless light source is raised in the industry, that is, an ONU transceiver module is independent of a wavelength, an emission wavelength may be automatically adapted to the wavelength of a connected AWG or WGR port, so that the ONU transceiver module can achieve plug-and-play on any AWG or WGR port.

In order to achieve the colorless ONU transceiver module of the WDM-PON, multiple solutions are proposed in the industry, including a self-seeding fiber laser. Referring to FIG. 2, a schematic diagram of a WDM-PON system using a self-seeding laser is illustrated. In the WDM-PON system, after a multi-longitudinal-mode optical signal emitted by a self-injection locking laser of a user end ONU is filtered by an AWG at a remote node (RN), only an optical signal of a corresponding wavelength may permeate the RN-AWG and enter a partial reflection mirror (PRM) disposed at a trunk fiber. Due to the partial reflection mirror, a part of light is reflected back and re-injected into the self-injection locking laser. A gain cavity of the self-injection locking laser amplifies the light reflected back again and then transmits the amplified light, and such round-trip oscillation is performed for multiple times. Accordingly, the self-injection locking laser and the partial reflection mirror cooperatively form an external cavity self-seeding laser, and a laser resonance oscillation cavity is formed in between and outputs a stable optical signal. After uplink data of the ONT being modulated to the optical signal, the uplink data of the ONU may further pass through the trunk fiber, and be demultiplexed by an AWG at a central office (CO) and then output to a corresponding receiver (Rx) of an OLT. Similarly, a downlink optical signal emitted by the OLT is demultiplexed by the RN-AWG, and then output to a receiver of a corresponding ONU.

Although the foregoing solution may achieve the colorless optical transceiver, the AWG needs to undertake functions of intra-cavity filtering for a transmitting end and demultiplexing for a receiving end at the same time. As for the transmitting end, each channel of the AWG is used as an intra-cavity filter of the self-seeding laser, which requires that a filtering curve of the AWG channel has narrow bandwidth and has a maximum transmissivity at a central wavelength of the channel. As for the receiving end, the AWG functions as demultiplexing, which requires that the AWG channel has a wide bandwidth and a transmission curve is flat in the channel. Due to the two contradictive requirements, the optical transceiver and the WDM-PON system that are based on the self-seeding laser have limited performances, and fail to meet the demand in practical application.

SUMMARY OF THE DISCLOSURE

Embodiments of the present disclosure provide an optical transceiver apparatus and a WDM-PON system based on the optical transceiver apparatus, to solve the problem of poor performance in the existing techniques.

An optical transceiver apparatus includes a gain medium, a photoelectric converter, at least one arrayed waveguide grating AWG, and a partial reflection mirror, where the at least one AWG includes two common ports and a plurality of branch ports. One of the common ports functions as a signal sending port, and the other one of the common ports functions as a signal receiving port. Bandwidth of the signal sending port is less than that of the signal receiving port. The gain medium and the photoelectric converter are connected to one of the branch ports of the AWG. The AWG and the partial reflection mirror are configured to cooperatively perform wavelength self-injection locking on an optical signal provided by the gain medium, and output the optical signal through the signal sending port. In addition, the AWG is further configured to demultiplex an optical signal received by the signal receiving port to a corresponding branch port.

A wavelength division multiplexing passive optical network system includes an optical transceiver apparatus at a central office and a an optical transceiver apparatus at a user end, where the optical transceiver apparatus at the central office and the optical transceiver apparatus at the user end each include the above-mentioned optical transceiver apparatus.

A wavelength division multiplexing passive optical network system includes an optical line terminal located at a central office and a plurality of optical network units located at a user end, where the optical line terminal is connected to the optical network units through fibers. The optical line terminal includes a plurality of optical transceiver apparatuses at the central office, where the optical transceiver apparatuses at the central office share a common arrayed waveguide grating AWG at the central office. The AWG at the central office includes two common ports and a plurality of branch ports. Each optical transceiver apparatus at the central office is correspondingly connected to one of the branch ports of the AWG at the central office respectively. One of the common ports of the AWG at the central office functions as a signal sending port at the central office, and the other one of the common ports of the AWG at the central office functions as a signal receiving port at the central office. Bandwidth of the signal sending port at the central office is less than that of the signal receiving port at the central office.

It may be known from the foregoing technical solutions that the AWG of the optical transceiver apparatus provided in embodiments of the present disclosure has two common ports, that is, the signal sending port and the signal receiving port, and the bandwidth of the signal sending port is less than that of the signal receiving port, so that the AWG may use different common ports respectively in sending and receiving an optical signal. As the bandwidth of the signal sending port is narrow, a transmission peak of the signal sending port is identical to a central wavelength of an AWG channel, thereby effectively improving the performance of signal transmission. Channel bandwidth corresponding to the signal receiving port is wide, which may ensure that the quality of a signal received after demultiplexing is good. Therefore, the performance of the optical transceiver apparatus and the WDM-PON system provided in embodiments of the present disclosure is improved.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are some embodiments of the present disclosure, and persons skilled in the art may derive other drawings from the accompanying drawings without creative efforts.

DETAILED DESCRIPTION OF THE EMBODIMENTS

The technical solution of the present disclosure is clearly and completely described in the following with reference to the accompanying drawings. It is obvious that the embodiments to be described are a part rather than all of the embodiments of the present disclosure. All other embodiments obtained by persons skilled in the art based on the embodiments of the present disclosure without creative efforts shall fall within the protection scope of the present disclosure.

Figure 1:
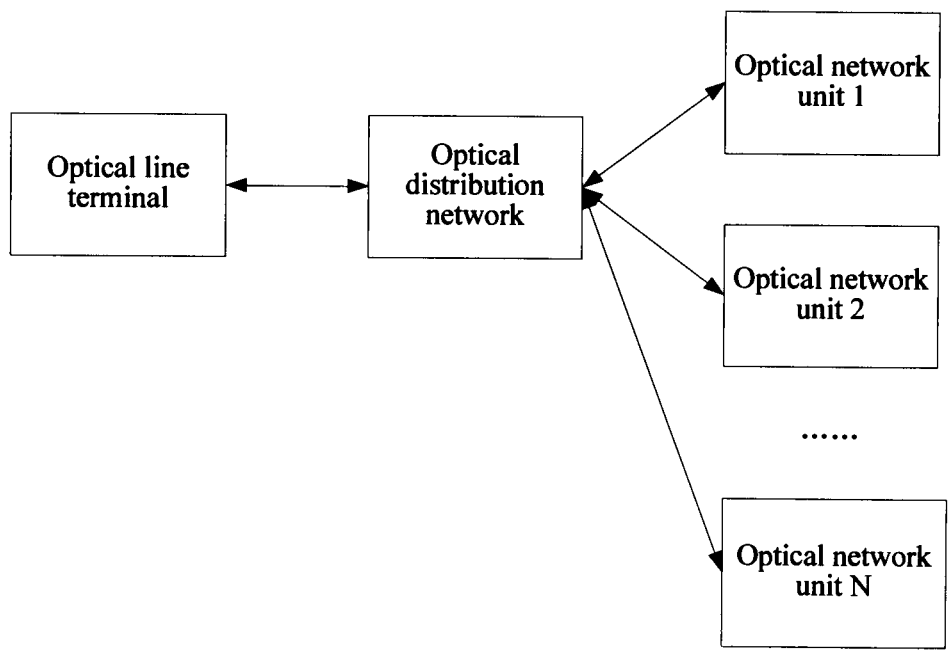
FIG. 1 is a schematic structural diagram of a passive optical network system.
Figure 2:
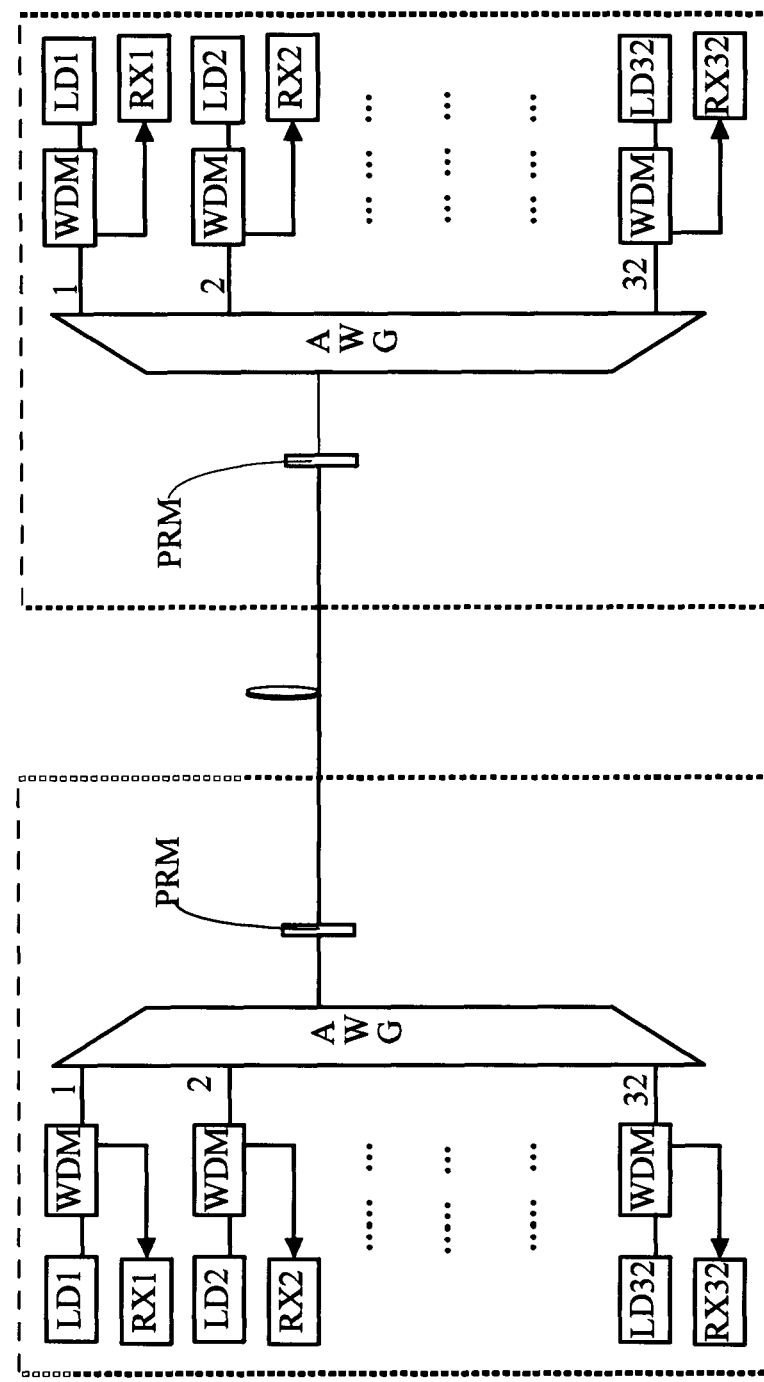
FIG. 2 is a schematic structural diagram of a WDM-PON system.

As described above, in a WDM-PON system shown in FIG. 2, an AWG undertakes the functions of forming an intracavity filter for a transmitting end and a demultiplexer for a receiving end. Since the two functions have contradictive requirements on bandwidth, for the applicability to sending and receiving an optical signal at the same time, in the industry, a compromise should be made when selecting a bandwidth of a common port of the AWG, which causes poor performance of an optical transceiver apparatus and a WDM-PON system based on a self-seeding laser at present.

An embodiment of the present disclosure provides an optical transceiver apparatus, where the optical transceiver apparatus may be a self-injection optical transceiver module, and include a transmitter and a receiver.

Figure 3:
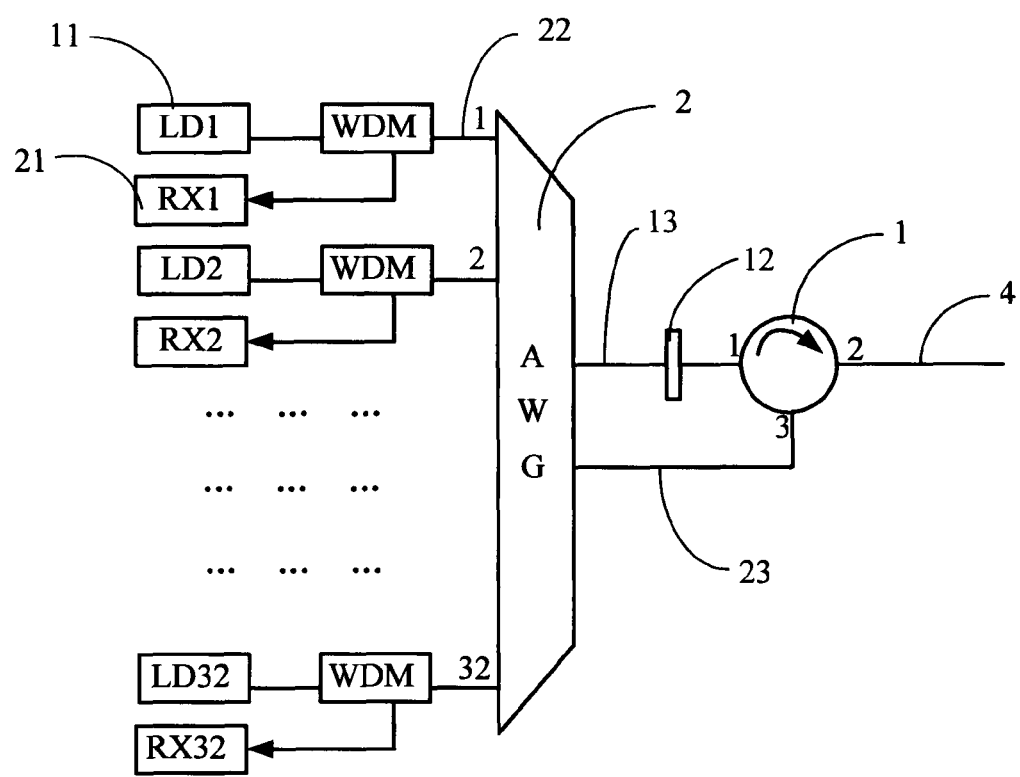
FIG. 3 is a schematic structural diagram of an optical transceiver apparatus according to an embodiment of the present disclosure.

Referring to FIG. 3, the transmitter of the optical transceiver apparatus includes a gain medium 11, an AWG 2, and a partial reflection mirror 12. The AWG 2 includes a branch port 22 connected to the gain medium 11, and a signal sending port 13 connected to the partial reflection mirror 12, where a wavelength channel of the branch port 22 is corresponding to a working wavelength of the transmitter, and the signal sending port 13 is configured to send an optical signal provided by the gain medium 11 to a trunk fiber 4. The receiver of the optical transceiver apparatus includes a photoelectric converter 21 and an AWG 2. The AWG 2 is connected to the photoelectric converter 21 through the branch port 22; and the AWG 2 may be further disposed with a signal receiving port 23 configured to receive the optical signal from the trunk fiber 4.

In the embodiment, the transmitter and the receiver may share the AWG 2, for example, the AWG 2 may function as a filter of the transmitter in one aspect, configured to limit a wavelength of the optical signal transmitted by the transmitter to the working wavelength of the optical transceiver apparatus, and may function as a demultiplexer of the receiver in another aspect, configured to demultiplex the optical signal received from the trunk fiber 4 to the corresponding branch port 22, so that the optical signal is received by the photoelectric converter 21.

In a specific embodiment, the optical transceiver apparatus may further include a circulator 1. The signal sending port 13 and the signal receiving port 23 of the AWG 2 may be connected to the trunk fiber 4 through the circulator 1. Moreover, the partial reflection mirror 12 may be disposed between the signal sending port 13 and the circulator 1. The circulator 1 may provide the optical signal from the signal sending port 13 to the trunk fiber 4, and provide the optical signal from the trunk fiber 4 to the signal receiving port 23. In other alternative embodiments, the circulator may be replaced by a wavelength division multiplexer.

Furthermore, bandwidth of the signal sending port 13 is less than that of the signal receiving port 23, for example, 3 dB bandwidth of the signal sending port 13 may be relatively narrow, so as to improve the filtering function for the transmitter of the optical transceiver apparatus, and 3 dB bandwidth of the signal receiving port 23 may be relatively wide, so as to improve the demultiplexing function for the receiver of the optical transceiver apparatus.

Specifically, taking an optical transceiver apparatus of an OLT disposed at a central office of a WDM-PON system as an example, the optical transceiver apparatus may send a downlink optical signal to a user end ONU through the trunk fiber 4 connected to the optical transceiver apparatus, and receive an uplink optical signal from the user end ONU. In an embodiment of the present disclosure, two types of common ports are disposed in the AWG 2 of the optical transceiver apparatus, namely, the signal sending port 13 and the signal receiving port 23. The signal sending port 13 is configured to send the downlink optical signal, and the signal receiving port 23 is configured to receive the uplink optical signal. As the signal sending port 13 and a corresponding branch port of the AWG 2 cooperatively form an intra-cavity filter of a self-injection laser, in order to ensure a relatively narrow spectrum of the downlink optical signal transmitted by the optical transceiver apparatus at the central office to improve the quality of the signal, in the embodiment of the present disclosure, the signal sending port 13 may be designed such that 3 dB bandwidth of the signal sending port 13 is relative narrow and the signal sending port 13 have a maximum transmissivity at the central wavelength of the channel Specifically, the signal sending port 13 may be a Gaussian-type port having narrow 3 dB bandwidth.

For the signal receiving port 23 configured to receive the uplink optical signal, in the embodiment of the present disclosure, the signal receiving port 23 may be designed such that a 3 dB bandwidth of the signal receiving port 23 is relatively wide That is, the pass band wavelength of the signal receiving port 23 has a small transmissivity variation in a wide range, so that the optical transceiver apparatus has a good receiving performance when receiving the uplink optical signal. Specifically, the signal receiving port 23 may be a flat-type port having a wide 3 dB bandwidth. It should be understood that, the "wide 3 dB bandwidth" and the "narrow 3 dB bandwidth" are relative terms, and specific bandwidth may be configured according to the number of the wavelength channels of the AWG 2. In order to ensure the performance of the optical transceiver apparatus, in the embodiment of the present disclosure, the 3 dB bandwidth of the signal sending port 13 is at least less than the 3 dB bandwidth of the signal receiving port 23.

For better understanding of the embodiment of the present disclosure, an operation of the optical transceiver apparatus is introduced briefly in the following.

Specifically, in an embodiment of the present disclosure, a transmitter may include the gain medium 11, the AWG 2, and the partial reflection mirror 12. A branch port 22 connected to the gain medium 11 and a signal sending port 13 connected to the partial reflection mirror 12 are disposed in the AWG 2. The signal sending port 13 is further connected to a circulator 1 or a wavelength division multiplexer, and the circulator 1 or the wavelength division multiplexer is further connected to a trunk fiber 4. In this way, when the optical transceiver apparatus sends a downlink optical signal, the gain medium 11 is stimulated and starts to emit an ASE (Amplified Spontaneous Emission) optical signal. After the ASE optical signal passes through a wavelength channel of the AWG 2, optical signals beyond the corresponding wavelength channel are filtered out or lost, and therefore, only an optical signal with wavelength within a pass band range determined by the branch port 22 and the signal sending port 13 of the AWG 2 can pass through the AWG 2. Then, the optical signal is transmitted to the partial reflection mirror 12 through the signal sending port 13, where a part of the optical signal is reflected back by the partial reflection mirror 12, injected into the gain medium 11, and amplified again. Such a round trip is performed for multiple times. In this way, the round trips of the optical signal between the gain medium 11 and the partial reflection mirror 12 for multiple times result in resonance oscillation amplification, and finally enable the optical signal generated by the transmitter to work at a transmission peak wavelength determined by the signal sending port 13 and the branch port 22, thereby forming a downlink optical signal that may be sent through the signal sending port 13. After passing through the signal sending port 13, the downlink optical signal is further sent to the trunk fiber 4 through the circulator 1 or the wavelength division multiplexer, and is transmitted by the trunk fiber 4 to a corresponding ONU at the user end.

In the embodiment of the present disclosure, the signal sending port 13 functions to form an intra-cavity filter in the transmitter, therefore, bandwidth design and optimization of the signal sending port 13 may be performed separately to enable the desired bandwidth to be relatively narrow, and a transmission peak is substantially identical to a central wavelength of the corresponding AWG channel, thereby effectively improving the performance of signal transmission.

Subsequently, in an embodiment of the present disclosure, a receiver may include the photoelectric converter 21 and the AWG 2. The branch port 22 connected to the photoelectric converter 21 and a signal receiving port 23 are further disposed in the AWG 2. The signal receiving port 23 is connected to a circulator 1 or a wavelength division multiplexer, and the circulator 1 or the wavelength division multiplexer is further connected to the trunk fiber 4. In this way, an uplink optical signal is transmitted from the trunk fiber 4 to the circulator 1 or the wavelength division multiplexer, and then is further conducted to the signal receiving port 23 by the circulator 1 or the wavelength division multiplexer. The AWG 2 demultiplexes the uplink optical signal to the branch port 22 corresponding to the receiver, and the optical signal is transmitted to the photoelectric converter 21 in the receiver through the branch port 22 of the AWG 2. Specifically, in the embodiment of the present disclosure, the photoelectric converter 21 may be a photoelectric diode.

For example, when the optical transceiver apparatus receives the uplink optical signal, the uplink optical signal transmitted by the trunk fiber 4 may pass through the circulator 1, enter the flat-type signal receiving port 23 with 3 dB bandwidth that is relatively wide, be demultiplexed by the AWG 2 to the corresponding branch port 22, and then provided by a wavelength division multiplexer to the photoelectric converter 21. As in the embodiment of the present disclosure, the signal receiving port 23 is configured separately and independent from the signal sending port 12, the channel bandwidth corresponding to the signal receiving port 23 may be designed to be relatively wide and a transmission curve of the signal receiving port 23 is flat, so that the quality of the signal received after demultiplexing is good.

In the embodiment of the present disclosure, two types of common ports are configured in the AWG in the optical transceiver apparatus, namely, a signal sending port with a 3 dB bandwidth that is relatively narrow and a signal receiving port with a 3 dB bandwidth that is relatively wide, so that the AWG may use different common ports for optical signal transmission and reception respectively. Moreover, the 3 dB bandwidth of the signal sending port is designed to be relatively narrow, and the 3 dB bandwidth of the signal receiving port is designed to be relatively wide, the quality of the optical signal reception and transmission of the optical transceiver apparatus is ensured. Accordingly, in the embodiment of the present disclosure, bandwidth optimization designs can be separately performed on the signal receiving port and the signal sending port of the optical transceiver apparatus, which significantly improves the performance of the optical transceiver apparatus.

Preferably, in an embodiment of the present disclosure, the gain medium in the transmitter may specifically include an IL FP-LD (Injection-Locked Fabry-Perot Laser Diode,) or an RSOA (Reflective Semiconductor Optical Amplifier,).

In an embodiment of the present disclosure, the partial reflection mirror may further be a Faraday rotator mirror. Specifically, a 45° one-way Faraday cup may be added before the partial reflection mirror, to form a faraday rotator mirror (FRM). In this manner, after the ASE optical signal transmitted by the transmitter is reflected by the Faraday rotator mirror, a polarization direction of the optical signal is rotated by 90°. In this way, a TE mode of the optical signal emitted from a laser transceiver becomes a TM mode after being reflected back by the FRM, and the emitted TM mode of the optical signal becomes the TE mode after being reflected back by the Faraday rotator mirror. Therefore, the correlation of polarization gain in a self-injection laser transceiver is diminished, which improves the ability of the optical transceiver apparatus in resisting random polarization interference in the embodiment of the present disclosure.

The optical transceiver apparatus provided in the embodiment of the present disclosure may be further applied in user end ONUs in the WDM-PON system, and a specific structure of the optical transceiver apparatus is similar to that of the optical transceiver apparatus at the central office. The difference lies in that, for the optical transceiver apparatus in the user end ONU, the receiver is configured to receive the downlink optical signal, and the transmitter is configured to send the uplink optical signal. Furthermore, the gain medium of the optical transceiver apparatus at the central office has a gain amplification function for a downlink wave band, and the gain medium of the optical transceiver apparatus at the user end has a gain amplification function for an uplink wave band. The AWG of the optical transceiver apparatus in the user end has the functions of multiplexing the uplink wave band and demultiplexing the downlink wave band. Moreover, in practice, when the optical transceiver apparatus is applied in the ONU at the user ends, the AWG and the partial reflection mirror can be placed at a remote node (RN), such that multiple optical transceiver apparatuses can shared a same AWG and a same partial reflection mirror.

In the embodiment shown in FIG. 3, in order to ensure the 3 dB bandwidth of the signal sending port 13 less than the 3 dB bandwidth of the signal receiving port 23, a waveguide at a signal sending end of the AWG 2 is designed to have an inverted conical structure. That is, a waveguide close to a Roland circle of the AWG 2 is narrow, and a waveguide at an output end is wide, so that the 3 dB bandwidth of the signal sending port is narrow. In addition, in the embodiment shown in FIG. 3, the bandwidth of the signal sending port 13 less than that of the signal receiving port 23 may be achieved through some other manners, for example, the 3 dB bandwidth of the signal receiving port may be increased by disposing a conical waveguide structure, a Mach-Zehnder interferometer structure, or a multimode coupler at the signal receiving port 23, or by cascading multiple AWGs.

In addition, in the embodiment of the present disclosure, the signal sending port and the signal receiving port having different bandwidths may also be achieved by use of two AWGs with different 3 dB bandwidth. That is, the two AWGs with different 3 dB bandwidth respectively function as a signal receiving AWG and a signal sending AWG. Specifically, a common port of the AWG with 3 dB bandwidth that is relatively narrow functions as the signal receiving port, and the AWG is referred to as the signal receiving AWG. A common port of the AWG with 3 dB bandwidth that is relatively wide functions as the signal sending port, and the AWG is referred to as the signal sending AWG.

In addition, in an embodiment of the present disclosure, the signal sending port and the signal receiving port having different bandwidths may also be achieved by use of two AWGs with the same 3 dB bandwidth and one periodic filter with narrow bandwidth. Specifically, in the two AWGs with the same 3 dB bandwidth, a common port of a signal sending AWG may be connected to the periodic filter with narrow 3 dB bandwidth, for example, a Fabry-Perot etalon, so that the optical signal sent by the signal sending AWG has 3 dB bandwidth that is relatively narrow. The other AWG may function as a signal receiving AWG, and 3 dB bandwidth of the signal receiving AWG is greater than that of the signal sending AWG.

Based on the optical transceiver apparatus, an embodiment of the present disclosure further provides a WDM-PON system. The WDM-PON system may include multiple optical transceiver apparatuses at a central office and multiple optical transceiver apparatuses at user ends. The optical transceiver apparatus provided in the above embodiments may be used as the optical transceiver apparatuses at the central office and the optical transceiver apparatuses at the user ends. The optical transceiver apparatuses at the central office may be disposed at an OLT, and may function as optical transceiver apparatuses of the OLT. The optical transceiver apparatuses at the user ends may be separately disposed at user ends, and function as optical transceiver apparatuses of the ONUs. Each of the optical transceiver apparatuses of the OLT corresponds to the optical transceiver apparatus of a respective ONU, and the operation wavelength of the optical transceiver apparatus of the OLT is the same as that of the corresponding one of the optical transceiver apparatuses of the ONU.

Figure 4:
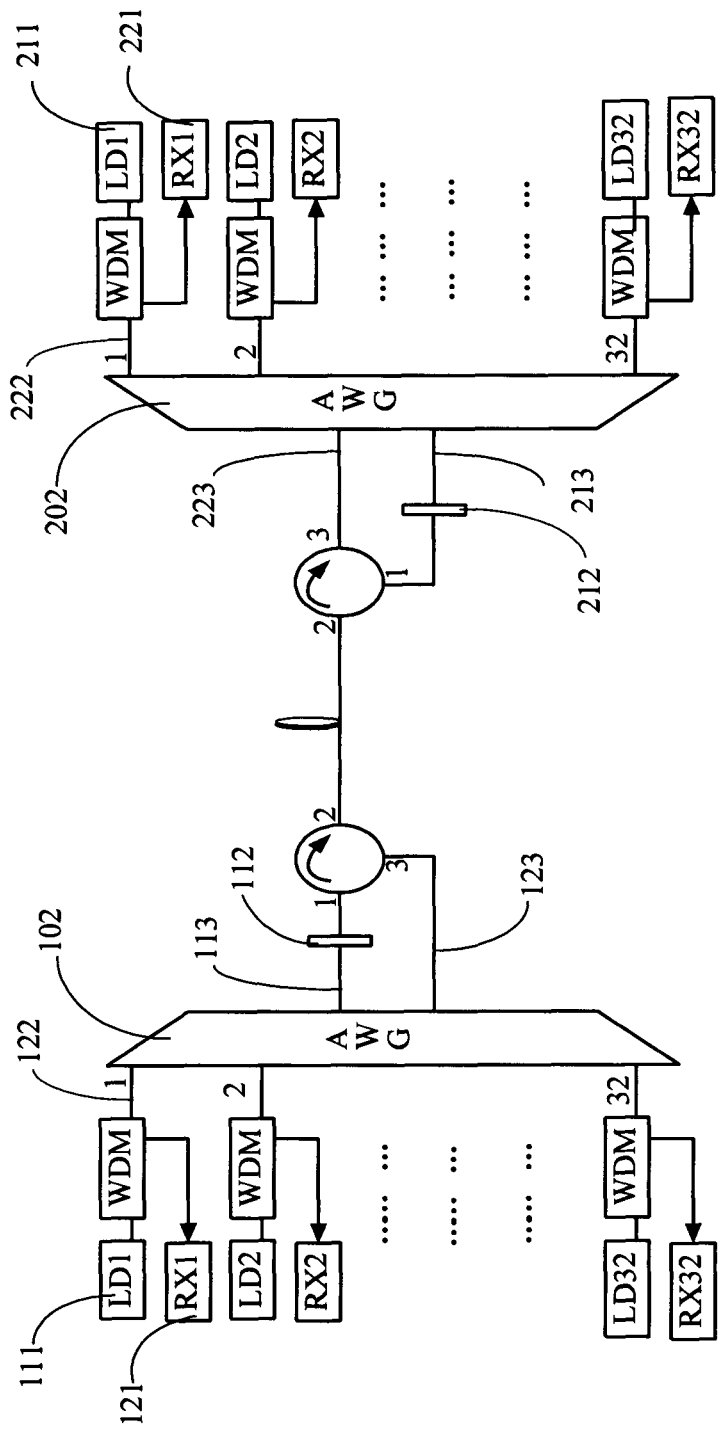
FIG. 4 is a schematic structural diagram of a WDM-PON system according to an embodiment of the present disclosure.

Specifically, referring to FIG. 4, the optical transceiver apparatus at the central office may include an AWG 102 and a partial reflection mirror 112. The AWG 102 includes multiple branch ports 122 and two common ports, the two common ports are respectively configured as a signal receiving port 123 and a signal sending port 113. Each of the branch port 122 is connected to a gain medium 111 and a photoelectric converter 121 through a wavelength division multiplexer. The signal sending port 113 has a Gaussian-type or semi-Gaussian-type filtering curve, and has 3 dB bandwidth that is relatively narrow. The signal receiving port 123 has a flat-type filtering curve, and has 3 dB bandwidth that is relatively wide.

The optical transceiver apparatus at the user end includes an AWG 202 and a partial reflection mirror 212. The AWG 202 includes multiple branch ports 222 and two common ports, and the two common ports are respectively configured as a signal sending port 213 and a signal receiving port 223. Each of the branch ports 222 is connected to a gain medium 211 and a photoelectric converter 221 through a wavelength division multiplexer. The signal sending port 213 has a Gaussian-type or semi-Gaussian-type filtering curve, and has 3 dB bandwidth that is relatively narrow. The signal receiving port 223 has a flat filtering curve, and has 3 dB bandwidth that is relatively wide.

In the optical transceiver apparatus at the central office shown in FIG. 4, each of the branch ports 122 is connected to a gain medium 111 and a photoelectric converter 121 through a wavelength division multiplexer, that is, the branch ports of the AWG 102 are correspondingly connected to the gain mediums 111 and the photoelectric converters 121 one by one. In other words, a first gain medium and a first photoelectric converter are connected to a first branch port, a second gain medium and a second photoelectric converter are connected to a second branch port, and the connection of other branch ports may be deduced by analogy. A location of the signal sending port 113 of the optical transceiver apparatus at the central office on a Roland circle of the AWG 102 is corresponding to a location of the signal receiving port 223 of the optical transceiver apparatus at the user end on the Roland circle of the AWG 202. A location of the signal receiving port 123 of the optical transceiver apparatus at the central office on the Roland circle of the AWG 102 is corresponding to a location of the signal sending port 213 of the optical transceiver apparatus at the user end on the Roland circle of the AWG 202.

In this way, a downlink optical signal generated by the optical transceiver apparatus at the central office is sent from the signal sending port 113 to a trunk fiber via the partial reflection mirror 112, enters the signal receiving port 223 of the optical transceiver apparatus at the user end, and is demultiplexed by the AWG 202 to a corresponding branch port 222, and then is provided to and received by a photoelectric converter 221 of the corresponding optical transceiver apparatus at the user end. Similarly, at the user end, the partial reflection mirror 212 is configured in the optical transceiver apparatus at the user end. An uplink optical signal generated by the optical transceiver apparatus at the user end is transmitted from the signal sending port 213 to the trunk fiber via the partial reflection mirror 212, enters the signal receiving port 123 of the optical transceiver apparatus at the central office, and is demultiplexed by the AWG 102 to a corresponding branch port 122, and then is provided to and received by a photoelectric converter 121 of the corresponding optical transceiver apparatus at the central office.

Figure 5:
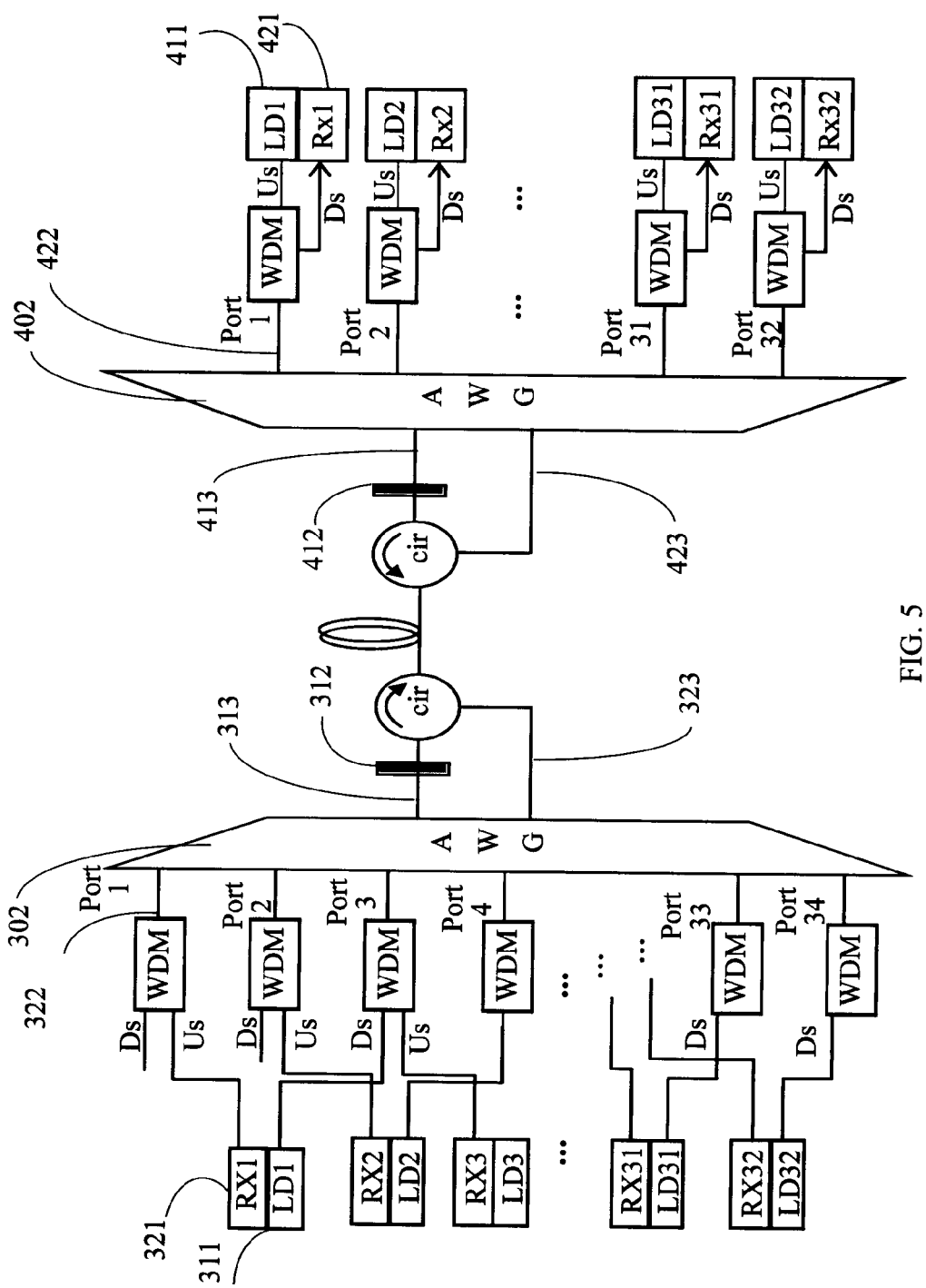
FIG. 5 is a schematic structural diagram of a WDM-PON system according to another embodiment of the present disclosure.

FIG. 5 is a schematic structural diagram of another embodiment of a WDM-PON system based on an optical transceiver apparatus of the present disclosure. In this embodiment, an AWG employed in the optical transceiver apparatuses is a non-wavelength 0-hop AWG. It is assumed that both an optical transceiver apparatus at a central office and a an optical transceiver apparatus at a user end include 32 receivers and transmitters, a location of a signal sending port 313 of an AWG 302 on a Roland circle of the AWG 302 corresponds to a location of a signal sending port 413 of an AWG 402 on a Roland circle of the AWG 402, and a location of a signal receiving port 323 on a Roland circle of the AWG 302 corresponds to a signal sending port 423 on the Roland circle of the AWG 402. In an embodiment, the signal receiving port 313 and the signal sending port 312 of the AWG 302 are spaced by a wavelength channel of the AWG 302, and the signal receiving port 413 and the signal sending port 412 of the AWG 402 are also spaced by a channel of the AWG 402; locations of the second to 33$^{rd}$ branch ports of the AWG 302 on the Roland circle of the AWG 302 are respectively corresponding to the first to 32$^{nd}$ branch ports of the AWG 402 on the Roland circle of the AWG 402. The first port of the AWG 302 is a previous port adjacent to the second port, and the 34$^{th}$ port is a next port adjacent to the 33$^{rd}$ port. Thus, when a downlink optical signal sent by a gain medium in the optical transceiver apparatus at the central office, where the gain medium is connected to a k$^{th}$ branch port (k=1, 2 . . . , 32) of the AWG 302, passes through the AWG 402 of the optical transceiver apparatus at the user end, the downlink optical signal may not be demultiplexed to a k$^{th}$ branch port (that is, a k$^{th}$ user) of the AWG 402. In view of this, in this embodiment, to enable the downlink optical signal transmitted by the k$^{th}$ gain medium in the optical transceiver apparatus at the central office to enter the k$^{th}$ branch port of the AWG 402 of the optical transceiver apparatus at the user end, that is, to enable the downlink optical signal to be received by the k$^{th}$ photoelectric converter in the optical transceiver apparatus at the user end, fiber connections of the AWG 302 of the optical transceiver apparatus at the central office can be modified. As for a specific fiber connection manner, reference may be made to FIG. 5.

A possible value of channel spacing between the signal receiving port and the signal sending port of the AWG 302 may be 1, 2, 3, or the like. In designing a manner of connection between the gain medium and the branch port of the AGW 302 in the optical transceiver apparatus at the central office, it is assumed that the channel spacing between the signal receiving port and the signal sending port of the AWG 302 is m. In this case, the k$^{th}$ gain medium in the optical transceiver apparatus at the central office only needs to be connected to the (k+2m)$^{th}$ branch port in the AWG 302. In order to ensure that an uplink optical signal sent by the k$^{th}$ user of the optical transceiver apparatus at the user end can enter the k$^{th}$ receiver at the central office, it is required that the location of the m$^{th}$ port of the AWG 302 of the optical transceiver apparatus at the central office on the Roland circle of the AWG 302 is corresponding to the location of the first port of the AWG 402 in the optical transceiver apparatus at the user end on the Roland circle of the AWG 402.

In this embodiment, with the modification of the connection between the gain medium and the branch port of the AWG 302 in the optical transceiver apparatus at the central office, the branch ports of the AWG 402 and the gain media in the optical transceiver apparatus at the user end only need to be connected one by one correspondingly, as shown in FIG. 5.

Specifically, the downlink optical signal from the optical transceiver apparatus at the central office enters the trunk fiber through the transmitting port 312 of the AWG 302, and then enters the signal receiving port 423 of the AWG 402 in the optical transceiver apparatus at the user end. As in the embodiment of the present disclosure, the AWG employed in the optical transceiver apparatus is a non-wavelength 0-hop AWG, that is, the channel of the signal sending port of the AWG 302 is different from that of the signal receiving port of the AWG 402. Specifically, for example, in this embodiment, the channel spacing is 1; in this case, a downlink optical signal sent by the (k+2)th branch port of the AWG 302 may be demultiplexed to the kth branch port of the AWG 402 in the optical transceiver apparatus at the user end. Therefore, in order to ensure that the optical transceiver apparatus in the embodiment of the present disclosure can work normally, the kth gain medium in the optical transceiver apparatus at the central office is further connected to the (k+2)th branch port of the AWG 302. For example, the first gain medium of the optical transceiver apparatus at the central office is connected to the third branch port of the AWG 302, the second gain medium is connected to the fourth branch port of the AWG 302, and connection of the remaining gain media and branch ports of the AWG 302 can be deduced by analogy. With this configuration, the optical transceiver apparatus at the user end may use a 32-channel AWG to form 32 receivers and transmitters, however, in the optical transceiver apparatus at the central office, as the 32nd gain medium needs to be connected to the 34th branch port of the AWG 302, the AWG 302 of the optical transceiver apparatus at the central office needs to be disposed with at least 34 branch ports. In practice, a 40-channel AWG may be used.

Figure 6:
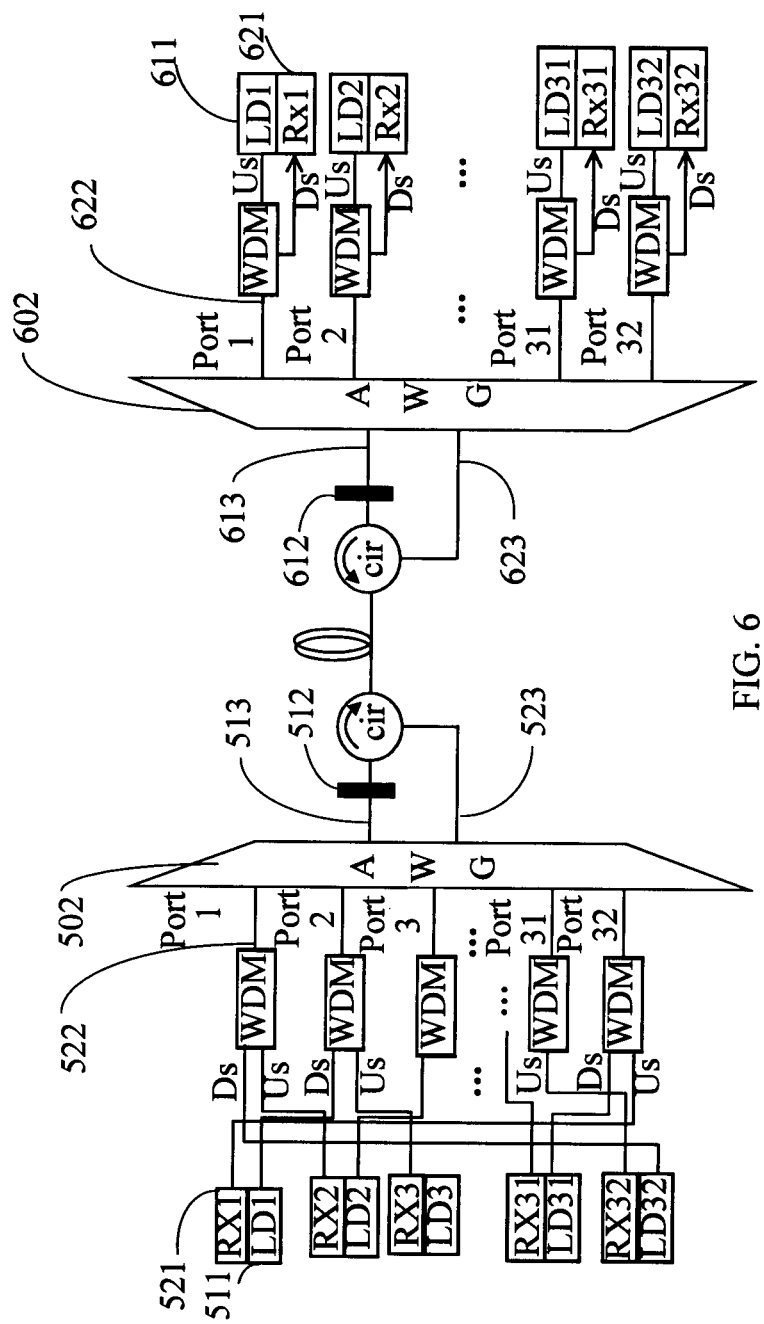
FIG. 6 is a schematic structural diagram of a WDM-PON system according to yet another embodiment of the present disclosure.

Referring to FIG. 6, in another embodiment of the present disclosure, an AWG used by a WDM-PON system may also be a wavelength 0-hop AWG.

Specifically, the embodiment shown in FIG. 6 is similar to the embodiment corresponding to FIG. 5. The difference lies in that the AWG of an optical transceiver apparatus in the embodiment shown in FIG. 6 is wavelength 0-hop AWG. Assuming the wavelength 0-hop AWG has N branch ports in total, as the ports of the wavelength 0-hop AWG has a circulating characteristic, that is, a $k^{th}$ wavelength and a $(k+N)^{th}$ wavelength may occur at the same port, a wavelength next to that of an $N^{th}$ channel of the AWG may reoccur at a first channel, and then the circulation continues.

When both an optical transceiver apparatus at a central office and an optical transceiver apparatus at a user end employ the same wavelength 0-hop AWG, and two common ports of the AWG are two adjacent channels, in order to send a downlink optical signal provided by a first gain medium in the optical transceiver apparatus at the central office to a photoelectric converter connected to a first branch port in an AWG 602, a first gain medium 511 in the optical transceiver apparatus at the central office may be connected to a second branch port in an AWG 502. Connection manners of other gain mediums are similar to that of the first gain medium, except the last gain medium of the optical transceiver apparatus at the central office. Specifically, a second gain medium needs to be connected to a third branch port in the AWG 502, and the rest may be deduced by analogy. The last gain medium in the optical transceiver apparatus at the central office needs to be connected to the first branch port in the AWG 502. In this way, the photoelectric converters 621 in the optical transceiver apparatus at the user end respectively correspond to the gain mediums 511 of self-injection optical fiber laser transceivers 500 at the central office.

A second photoelectric converter in the optical transceiver apparatus at the central office is connected to the first branch port of the AWG 502, so as to receive an uplink optical signal sent by the first gain medium in the optical transceiver apparatus at the user end. Connection manners of other photoelectric converters are similar to that of the second photoelectric converter, except the first photoelectric converter of the optical transceiver apparatus at the central office. Specifically, a third photoelectric converter of the optical transceiver apparatus at the central office needs to be connected to the second branch port in the AWG 502, and the rest may be deduced by analogy. The first photoelectric converter in the optical transceiver apparatus at the central office needs to be connected to a last branch port in the AWG 502.

In another embodiment of the present disclosure, two AWGs with different 3 dB bandwidth may be combined, where a common port of the AWG with 3 dB bandwidth that is relatively narrow serves as a signal sending port, and a common port with 3 dB bandwidth that is relatively wide serves as a signal receiving port. In this way, a partial reflector is connected to the signal sending port of the AWG with 3 dB bandwidth that is relatively narrow, and a received signal is connected to the signal receiving port of the AWG with 3 dB bandwidth that is relatively wide.

Figure 7:
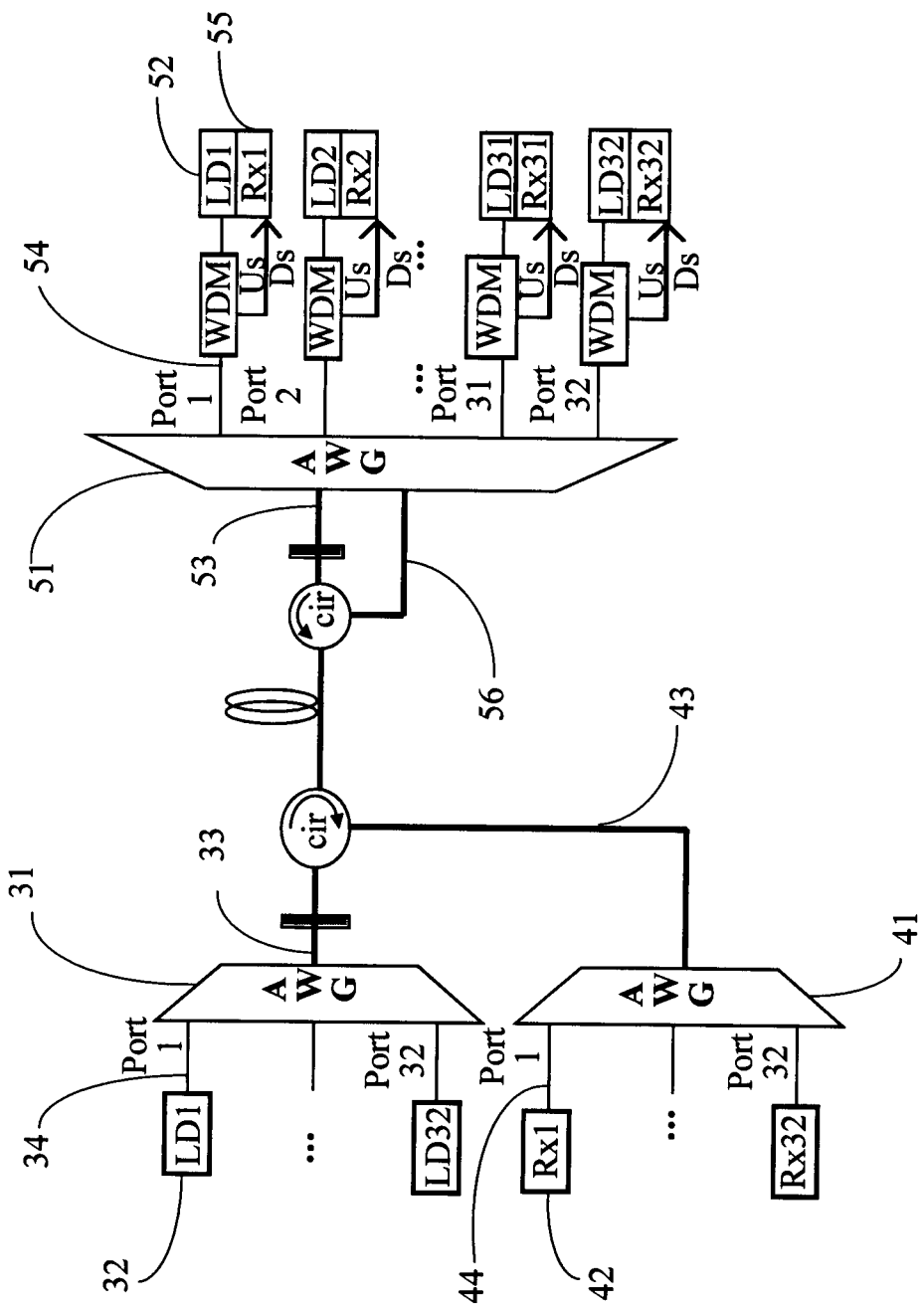
FIG. 7 is a schematic structural diagram of a WDM-PON system according to yet another embodiment of the present disclosure.

Specifically, referring to FIG. 7, an optical transceiver apparatus at a central office may include an AWG 31 and an AWG 41, and the two AWGs have different 3 dB bandwidth respectively. An optical transceiver apparatus at a user end may use an AWG 51 having two common ports with different 3 dB bandwidth.

The AWG 31 includes a signal sending port 33 with 3 dB bandwidth that is relatively narrow, and the signal sending port 33 is configured to send a downlink optical signal. The AWG 41 includes a signal receiving port 43 with 3 dB bandwidth that is relatively wide, and the signal receiving port 43 is configured to receive an uplink optical signal. The AWG 51 includes a signal sending port 53 with 3 dB bandwidth that is relatively narrow and a signal receiving port 56 with 3 dB bandwidth that is relatively wide.

In the embodiment of the present disclosure, specific operation of the optical transceiver apparatus at the central office and the optical transceiver apparatus at the user end is as follow. A first gain medium 32 of the optical transceiver apparatus at the central office sends, through a first branch port 34, a downlink optical signal along the signal sending port 33 to a trunk fiber. After the signal receiving port 56 of the AWG 51 receives the downlink optical signal, the downlink optical signal enters a first branch port 54 of the optical transceiver apparatus at the user end, and then enters a first photoelectric converter 52.

A first gain medium 52 of the optical transceiver apparatus at the user end sends, through the first branch port 54, an uplink optical signal along the signal sending port 53 to the trunk fiber. After the signal receiving port 43 of the AWG 41 receives the uplink optical signal, the uplink optical signal enters a first branch port 44 of the AWG 41, and then enters the first photoelectric converter 42.

Figure 8:
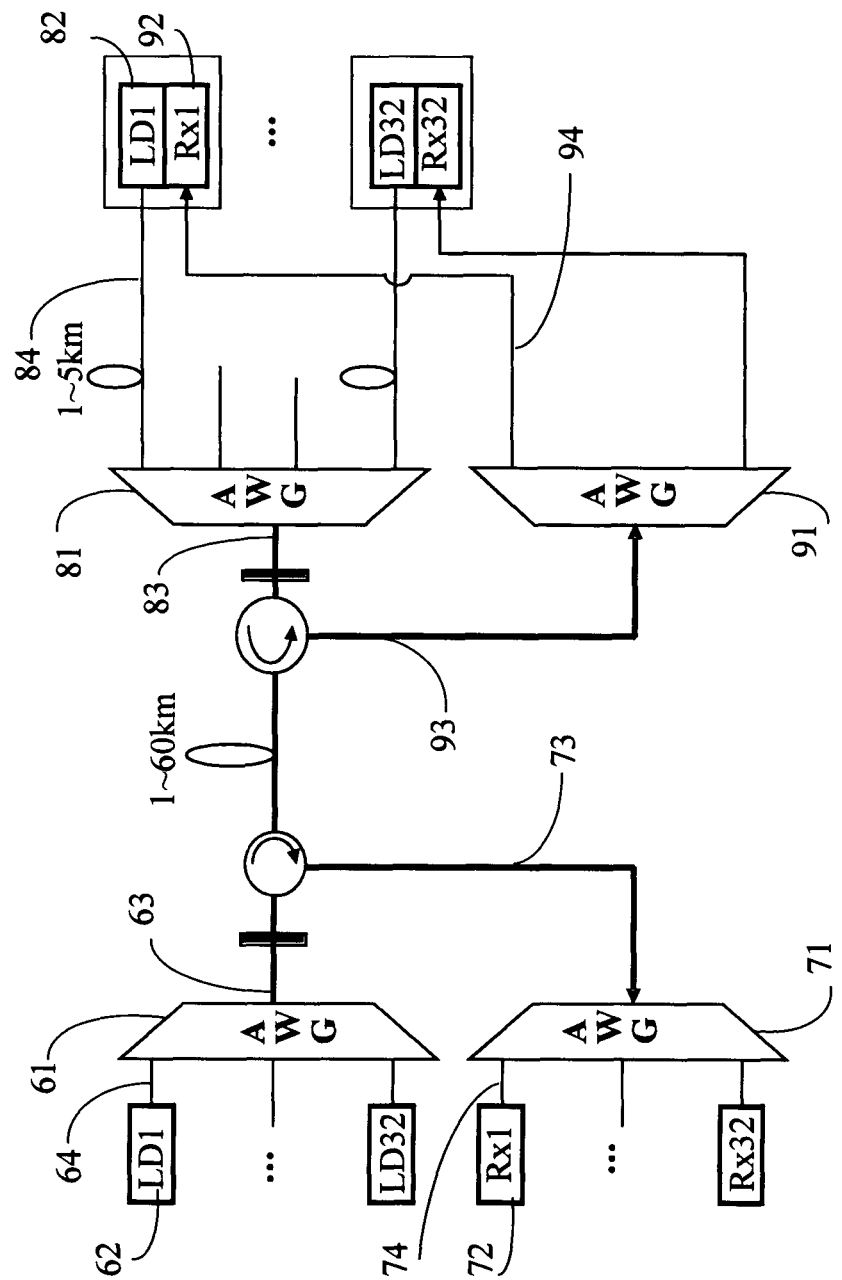
FIG. 8 is a schematic structural diagram of a WDM-PON system according to yet another embodiment of the present disclosure.

In addition, in another embodiment of the present disclosure, the optical transceiver apparatus at the central office and the optical transceiver apparatus at the user end may be set to be formed by two AWGs. Specifically, referring to FIG. 8, an optical transceiver apparatus at a central office may include an AWG 61 and an AWG 71, and the two AWGs have different 3 dB bandwidth respectively. An optical transceiver apparatus at a user end may include an AWG 81 and an AWG 91, and the two AWGs have different 3 dB bandwidth respectively.

The AWG 61 includes a signal sending port 63 with 3 dB bandwidth that is relatively narrow, and the signal sending port 63 is configured to send a downlink optical signal. The AWG 71 includes a signal receiving port 73 with 3 dB bandwidth that is relatively wide, and the signal receiving port 73 is configured to receive an uplink optical signal. The AWG 81 includes a signal sending port 83 with 3 dB bandwidth that is relatively narrow, and the signal sending port 83 is configured to send an uplink optical signal. The AWG 71 includes a signal receiving port 93 with 3 dB bandwidth that is relatively wide, and the signal receiving port 93 is configured to receive a downlink optical signal.

In the embodiment of the present disclosure, a specific operation of the optical transceiver apparatus at the central office and the optical transceiver apparatus at the user end is as follows. A fist gain medium 62 of the optical transceiver apparatus at the central office sends, through a first branch port 64, a downlink optical signal along the signal sending port 63 to a trunk fiber. After the signal receiving port 93 of the AWG 91 receives the downlink optical signal, the downlink optical signal enters a first branch port 94 of the AWG 91, and then enters a first photoelectric converter 92.

A first gain medium 82 of the optical transceiver apparatus at the user end sends, through a first branch port 84 of the AWG 81, an uplink optical signal along the signal sending port 83 to the trunk fiber. After the signal receiving port 73 of the AWG 71 receives the uplink optical signal, the uplink optical signal enters a first branch port 74 of the AWG 71, and then enters a first photoelectric converter 72 of the optical transceiver apparatus at the central office.

In the embodiments according to the present disclosure, an uplink wave band and a downlink wave band may be an FSR (Free Spectral Range, free spectral range) wave band adjacent to the AWG, or an FSR wave band not adjacent to the AWG.

Embodiments in this specification are described in a progressive way. Each embodiment highlights the difference from other embodiments, and for the same or similar parts of the embodiments, reference may be made to each other. The description on the apparatus disclosed in the embodiments is simple because the apparatus is corresponding to the method disclosed in the embodiments, and reference may be made to the description in the method part.

The descriptions on the disclosed embodiments enable persons skilled in the art to implement or practice the present disclosure. Modifications made to the embodiments are apparent to persons skilled in the art, and the general principles defined here may be implemented in other embodiments without departing from the spirit and scope of the present disclosure. Therefore, the present disclosure is not limited to the embodiments exemplified here, but complies within a broadest scope consistent with the principle and novel characteristics disclosed here.

What is claimed is:

1. An optical transceiver apparatus, comprising:
   a gain medium;
   a photoelectric converter;
   an arrayed waveguide grating (AWG); and
   a partial reflection mirror;
   wherein the AWG comprises two common ports and a plurality of branch ports, one of the common ports functioning as a signal sending port, the other one of the common ports functioning as a signal receiving port, wherein a bandwidth of the signal sending port is less than a bandwidth of the signal receiving port;
   wherein the gain medium and the photoelectric converter are connected to one of the branch ports of the AWG;
   wherein the AWG and the partial reflection mirror are configured to cooperatively perform wavelength self-injection locking on an optical signal provided by the gain medium, and output the optical signal through the signal sending port;
   wherein the AWG is further configured to demultiplex an optical signal received by the signal receiving port to a corresponding branch port; and
   wherein the optical transceiver apparatus further comprises a circulator or a wavelength division multiplexer, wherein the signal receiving port and the signal sending port of the AWG are coupled to a trunk fiber through the circulator or the wavelength division multiplexer, and the partial reflection mirror is located between the circulator or the wavelength division multiplexer and the signal sending port.

2. The optical transceiver apparatus according to claim 1, wherein the signal sending port is a Gaussian-type port, and the signal receiving port is a flat-type port.

3. The optical transceiver apparatus according to claim 2, wherein a transmission peak of the signal sending port is identical to a central wavelength of a corresponding channel of the AWG, and a transmission curve of the signal receiving port is a flat-type transmission curve.

4. The optical transceiver apparatus according to claim 1, wherein the signal receiving port comprises a Mach-Zehnder interferometer structure, a conical waveguide structure or a multimode coupler; and the signal sending port comprises an inverted conical waveguide structure.

5. The optical transceiver apparatus according to claim 1, wherein the partial reflection mirror comprise a Faraday rotator mirror.

6. The optical transceiver apparatus according to claim 1, wherein the at least one AWG comprises a signal sending AWG and a signal receiving AWG.

7. The optical transceiver apparatus according to claim 6, a common port of the signal receiving AWG functions as the signal receiving port, and a common port of the signal sending AWG functions as the signal sending port.

8. A wavelength division multiplexing passive optical network system, comprising:
   an optical line terminal located at a central office; and
   a plurality of optical network units located at user ends, the optical line terminal being connected to the optical network units through fibers;
   wherein the optical line terminal comprises a plurality of optical transceiver apparatuses at the central office;
   wherein the optical transceiver apparatuses at the central office share an arrayed waveguide grating (AWG) at the central office, the AWG at the central office comprising two common ports and a plurality of branch ports;
   wherein each optical transceiver apparatus at the central office is correspondingly connected to one of the branch ports of the AWG at the central office respectively, one of the common ports of the AWG at the central office functioning as a signal sending port at the central office, and the other one of the common ports of the AWG at the central office functioning as a signal receiving port at the central office;
   wherein a bandwidth of the signal sending port at the central office is less than a bandwidth of the signal sending port at the central office;
   wherein each optical transceiver apparatus at the central office comprises a gain medium, a partial reflection mirror, and a photoelectric converter, the gain medium and the photoelectric converter being connected to a corresponding one of the branch ports of the AWG at the central office;
   wherein the AWG and the partial reflection mirror at the central office are configured to cooperatively perform wavelength self-injection locking on an optical signal provided by the gain medium, and to send the optical signal to a corresponding optical network unit through the signal sending port;
   wherein the AWG at the central office is further configured to demultiplex an optical signal received by the signal receiving port to a corresponding branch port; and
   wherein the optical transceiver apparatus at the central office further comprises a circulator or a wavelength division multiplexer, wherein the signal receiving port and the signal sending port of the AWG at the central office are coupled to a trunk fiber through the circulator or the wavelength division multiplexer, and the partial reflection mirror at the central office is connected between the circulator or the wavelength division multiplexer and the signal sending port of the AWG at the central office.

9. The wavelength division multiplexing passive optical network system according to claim 8, wherein the optical transceiver apparatus at the user end further comprises a circulator or a wavelength division multiplexer, wherein the signal receiving port and the signal sending port of the AWG at the user end are coupled to the trunk fiber through the circulator or the wavelength division multiplexer, and the partial reflection mirror at the user end is connected between the circulator or the wavelength division multiplexer and the signal sending port of the AWG at the user end.

10. The wavelength division multiplexing passive optical network system according to claim 8, wherein the signal sending port of the AWG at the central office is a Gaussian-type port, and the signal receiving port of the AWG at the central office is a flat-type port, a transmission peak of the signal sending port of the AWG at the central office is identical to a central wavelength of a corresponding channel of the AWG at the central office, and a transmission curve of the signal receiving port of the AWG at the central office is a flat-type transmission curve.

11. The wavelength division multiplexing passive optical network system according to claim 8, wherein the signal receiving port of the AWG at the central office comprises a Mach-Zehnder interferometer structure, a conical waveguide structure or a multimode coupler; and the signal sending port comprises an inverted conical waveguide structure.

12. A passive optical network (PON) system, comprising:
a plurality of central office (CO) optical transceiver apparatuses sharing a central office array waveguide grating (CO-AWG); and
a plurality of user end (UE) optical transceiver apparatuses sharing a remote node AWG (RN-AWG) and a partial reflection mirror (PRM);
wherein the RN-AWG is connected to the CO-AWG via a fiber and comprises two common ports and a plurality of branch ports, each of the UE optical transceiver apparatuses comprises a gain medium connected to one of the branch ports of the RN-AWG, one of the common ports of the RN-AWG serving as a UE signal sending port and being connected to the fiber via the RPM, and the other one of the common ports of the RN-AWG serving as a UE signal receiving port and being connected to the fiber;
wherein a bandwidth of the UE signal sending port is less than that of the UE signal sending port;
wherein the gain medium, the RN-AWG, and the PRM are configured to cooperatively perform wavelength self-injection locking on a first optical signal provided by the gain medium, and output the first optical signal to the fiber through the UE signal sending port;
wherein the AWG is further configured to demultiplex a second optical signal received by the UE signal receiving port from the fiber to a corresponding branch port; and
wherein the PON system further comprises a circulator connected to the fiber for providing the first optical signal sent by the UE signal sending port to the fiber and providing the second optical signal transmitted over the fiber to the UE signal receiving port.

13. The PON system according to claim 12, wherein the UE signal sending port is a Gaussian-type port, and the UE signal receiving port is a flat-type port.

14. The PON system according to claim 13, wherein a transmission peak of the UE signal sending port is substantially identical to a central wavelength of a corresponding wavelength channel of the RN-AWG, and a transmission curve of the UE signal receiving port is a flat-type transmission curve.

15. The PON system according to claim 14, wherein the UE signal receiving port comprises a Mach-Zehnder interferometer structure, a conical waveguide structure or a multimode coupler; and the UE signal sending port comprises an inverted conical waveguide structure.

16. The optical transceiver apparatus according to claim 7, further comprising a periodic filter, wherein the periodic filter is connected to the common port of the signal sending AWG, and configured to reduce a bandwidth of the common port of the signal sending AWG, so that the bandwidth of the common port of the signal sending AWG is less than a bandwidth of the common port of the signal receiving AWG.

* * * * *